US012141867B2

(12) United States Patent
Rechtschaffen et al.

(10) Patent No.: US 12,141,867 B2
(45) Date of Patent: *Nov. 12, 2024

(54) SYSTEMS AND METHODS FOR DISTRIBUTED ENCODING AND GLOBAL EXCHANGE ARCHITECTURE

(71) Applicant: Miera Rechtschaffen, New York, NY (US)

(72) Inventors: Miera Rechtschaffen, New York, NY (US); Alan Rechtschaffen, New York, NY (US)

(73) Assignees: Miera Rechtschaffen, New York, NY (US); Alan Rechtschaffen, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/194,128

(22) Filed: Mar. 31, 2023

(65) Prior Publication Data

US 2023/0237581 A1 Jul. 27, 2023

Related U.S. Application Data

(63) Continuation of application No. 17/001,002, filed on Aug. 24, 2020, now Pat. No. 11,790,444.

(Continued)

(51) Int. Cl.
*G06Q 40/04* (2012.01)
*G06F 16/27* (2019.01)
(Continued)

(52) U.S. Cl.
CPC ............ *G06Q 40/04* (2013.01); *G06F 16/27* (2019.01); *G06Q 20/02* (2013.01);
(Continued)

(58) Field of Classification Search
CPC .... G06Q 40/04; G06Q 20/02; G06Q 20/0655; G06Q 20/3672; G06Q 20/381;
(Continued)

(56) References Cited

U.S. PATENT DOCUMENTS 10,055,715 B1 * 8/2018 Grassadonia et al. . G06Q 40/00
10,108,938 B1 * 10/2018 Brock et al. ........... G06Q 40/00
(Continued)

OTHER PUBLICATIONS

Costas Mourselas et al., Byte me: stablecoins buck and break, Oct. 18, 2018, Global Capital Money Institutional Investor PLC. (Year: 2018).*

*Primary Examiner* — Scott C Anderson
*Assistant Examiner* — George N. Proios
(74) *Attorney, Agent, or Firm* — Fay Kaplun & Marcin, LLP

(57) ABSTRACT

Various aspects of the disclosure relate to using a verifiable and distributed encoding as a digital currency (e.g., cryptocurrency). According to some embodiments, systems and methods can be executed to transfer cash or "hard" currency responsive to exchange of cryptocurrency supported by blockchain technology. In further example, the systems and methods are tailored to operate within a specified/defined community that ensures the efficient operation of the system by ensuring liquidity of the transfer. According to one embodiment, the system is configured to distribute stable coin, issuing the coin at a discounted value (e.g., relative to a redemption or cash equivalent face value). For example, by issuing coin at a discount the system automatically facilitates peer-to-peer physical cash transfers.

20 Claims, 9 Drawing Sheets

Related U.S. Application Data

(60) Provisional application No. 62/891,178, filed on Aug. 23, 2019.

(51) Int. Cl.
  *G06Q 20/02* (2012.01)
  *G06Q 20/06* (2012.01)
  *G06Q 20/36* (2012.01)
  *G06Q 20/38* (2012.01)
  *G06Q 30/018* (2023.01)
  *G06Q 30/0207* (2023.01)
  *G06Q 40/02* (2023.01)
  *H04L 9/06* (2006.01)
  *H04L 9/00* (2022.01)

(52) U.S. Cl.
  CPC ...... *G06Q 20/0655* (2013.01); *G06Q 20/3672* (2013.01); *G06Q 20/381* (2013.01); *G06Q 30/0185* (2013.01); *G06Q 30/0236* (2013.01); *G06Q 40/02* (2013.01); *H04L 9/0637* (2013.01); *G06Q 2220/00* (2013.01); *H04L 9/50* (2022.05); *H04L 2209/56* (2013.01)

(58) Field of Classification Search
  CPC ........... G06Q 30/0185; G06Q 30/0236; G06Q 40/02; G06Q 2220/00; G06Q 20/065; G06Q 20/0658; G06Q 20/387; G06F 16/27; H04L 9/0637; H04L 9/50; H04L 2209/56; H04L 9/3239; H04L 9/3247
  USPC .......................................................... 705/66
  See application file for complete search history.

(56) References Cited

U.S. PATENT DOCUMENTS

| | | | |
|---|---|---|---|
| 10,373,129 B1* | 8/2019 | James et al. | G06Q 20/06 |
| 10,373,158 B1* | 8/2019 | James et al. | G06Q 20/38 |
| 10,438,290 B1* | 10/2019 | Winklevoss et al. | G06Q 40/06 |
| 2015/0363876 A1* | 12/2015 | Ronca et al. | G06Q 40/04 |
| 2019/0081789 A1* | 3/2019 | Madisetti et al. | H04L 9/32 |
| 2019/0272537 A1* | 9/2019 | Miller et al. | G06Q 20/38 |
| 2022/0318796 A1* | 10/2022 | Zhou et al. | G06Q 20/3829 |

* cited by examiner

SYSTEMS AND METHODS FOR DISTRIBUTED ENCODING AND GLOBAL EXCHANGE ARCHITECTURE

RELATED APPLICATIONS

This application is a non-provisional application claiming priority under 35 U.S.C. § 119(e) to U.S. Provisional Application No. 62/891,178, filed on Aug. 23, 2019, titled "SYSTEMS AND METHODS FOR DISTRIBUTED ENCODING AND GLOBAL EXCHANGE ARCHITECTURE," which application is incorporated herein by reference in its entirety.

BACKGROUND

Cryptocurrency defines a digital asset that establishes virtual money. Currency is a concept that an object (paper, coin, script) can represent value and thus might be used to acquire goods and services and thus qualifies for exchange as "money." Cryptocurrency digitizes that concept. With Cryptocurrency, record-keepers generate hash values when a transaction occurs and if approved a "block" is created to add to a distributed ledger that can be used to validate exchanges and/or operation. The "Blockchain" is a chain of these entries and is, in essence, the ledger itself.

The blockchain is supported across multiple computers (nodes) that are linked in a peer-to-peer network. Blockchain technology is designed to solve the "trust problem." It creates a verifiable ledger that no one node can compromise. It is transparent, time-stamped and decentralized.

SUMMARY

The inventors have realized that the premise for cryptocurrency can be modified and extended, to a peer to peer cryptocurrency transfer system, where fiat currency is moved via bank-to-bank transfer or by delivery of hard cash. The structure of this system is built on an adaptation of biological principles with regards to oxygen transference throughout the human body. In various embodiments, the system is configured to move fiat currency, for example, internationally, eliminating intermediary systems typically required for international exchange. According to various aspects, the system architecture eliminates the intermediary systems and operations required in various conventional exchanges and further enables operations without the associated transaction fees that plague conventional exchange. In further embodiments, the architecture is configured to facilitate compliance with anti-money laundering ("AML") guidelines and jurisdictional rules.

Various aspects of the disclosure relate to using a verifiable and distributed encoding as a digital currency (e.g., cryptocurrency). According to some embodiments, systems and methods can be executed to transfer cash or "hard" currency responsive to exchange of cryptocurrency supported by blockchain technology. In further example, the systems and methods are tailored to operate within a specified/defined community that ensures the efficient operation of the system by ensuring liquidity of the transfer.

According to one embodiment, the system is configured to distribute stable coin, issuing the coin at a discounted value (e.g., relative to a redemption or cash equivalent face value). For example, by issuing coin at a discount the system automatically facilitates peer-to-peer physical cash transfers. In other examples, discount issuance can be associated with discounted purchases and electronic fund transfers; using one or more media devices that, when acting together, based on input commands, transfer cryptocurrency to other members; transfer cryptocurrency in return for goods or services; transfer cryptocurrency to a cryptocurrency issuer in return for the payment of fiat currency; and, where applicable, generate a barcode for a transfer recipient to present in order to receive physical cash; transfer cryptocurrency from one digital wallet to another upon the scanning of the bar code; reference a fiat currency exchange rate for physical cash transfers; reference the initial purchase price of the cryptocurrency as the notional value of cryptocurrency transfers; confirm that members are authorized to transfer cryptocurrencies for cash; link the issuer's escrow account to facilitate cryptocurrency redemptions; and record each transaction in a block on a blockchain.

Various aspects of the disclosure describe methods including (any one or more or any combination of the following steps): using a device comprising one or more memory devices to facilitate peer-to-peer cash transfers as part of a member rewards or point system; using fiat currency to purchase a stable-coin or token ("cryptocurrency") at a discount to its face value; allowing the user of the cryptocurrency to make purchases from the issuer, or from participating retailers at the cryptocurrency's face value; transferring the cryptocurrency between peer members anywhere in the world with little or no fees; facilitating peer-to-peer paper cash transfers by incentivizing a network of members to distribute cash to the recipients of a cryptocurrency transfer; storing information related to that cryptocurrency on a block of a blockchain. Various embodiments can also include (any one or more or any combination of the following) steps of: referencing a fiat currency exchange rate for transfers of cryptocurrency; referencing an agreement made with the issuer of the cryptocurrency, and participating retailers, as to the amount of cryptocurrency a particular holder may use to purchase goods or services; referencing the purchase price of the cryptocurrency to confirm that cash transfer dollar amounts correspond with the initial purchase price of the cryptocurrency in determining dollar transfer value; confirming that only eligible users are transferring cryptocurrencies for cash; debiting the issuer escrow account when cryptocurrencies are sent to the issuers wallet (redeemed for cash); linking the escrow account to the bank accounts of cryptocurrency holders and issuers; maintaining details of a collateral account to support the cryptocurrency transfer system; redeeming cryptocurrency at the purchase price; documenting the identity of cryptocurrency holder to confirm that they have met eligibility requirements, AML guidelines, and regulatory requirements for issuing cryptocurrencies; securely storing identifying information such as name, birthdates and social security number (where applicable); transferring cryptocurrencies between users using an APP; and using the APP to facilitate paper cash transfers by generating a barcode for the recipient of the transfer to pick up the money concurrent with the transfer of the cryptocurrency to a receiver's digital wallet.

According to one aspect a system for managing global cryptocurrency issuance and redemption is provided. The system comprises at least one processor operatively connected to a memory; a currency creation component, executed by the least one processor, configured to generate digital currency units and encodings of discount incentives; generate the digital currency units based on a stable face value having a first baseline value; manage exchange of at least one digital currency unit based on a second incentive value, wherein the second incentive value is less than the first baseline value between an issuer and recipient; create a block of a distributed ledger including the first baseline value and the incentive value and communicating the block to a distributed ledger responsive to exchange of the at least one digital currency unit; a community component, executed by the at least one processor, configured to register and validate a community of users, wherein the community component is further configured to link collateral accounts to respective users; a mapping component, executed by the at least one processor, configured to generate an encoded mapping associated to the at least one digital currency unit responsive to exchange of the at least one digital currency unit, and wherein the encoded mapping enables redemption of hard currency by a recipient user at at least the second incentive value or redemption at the first baseline value; determine a context of exchange including at least one of hard currency context or redemption context; execute transfer of the at least one digital currency unit responsive to triggering of the encoded mapping by a user receiving the digital currency unit in response to hard currency exchange; and execute transfer of the at least one digital currency unit responsive to triggering the encoded mapping by an entity receiving the digital currency unit in response to redemption at the first baseline value. According to one embodiment, the mapping component is further configured identify at least a third context of exchange including a direct transfer context between community members. According to one embodiment, the mapping component is further configured to execute transfer of the at least one digital currency unit responsive to triggering of the encoded mapping by a user receiving the digital currency unit in response to direct exchange. According to one embodiment, the at least one processor is further configured to generate a block of a distributed ledger including information about a recipient of the cryptocurrency, and publish the block to a public blockchain responsive to transfer, exchange, or redemption contexts. According to one embodiment, the mapping component is further configured to execute transfer of the at least one digital currency unit to an escrow account subject to confirmation of parties participating in the exchange. According to one embodiment, the system is further configured to release the at least one digital currency from the escrow account to the user receiving the at least one digital currency until responsive to a confirmation selection in a user interface communicated by a user transferring the at least one digital currency unit. According to one embodiment, the system further comprises a qualification component executed by the at least one processor configured to evaluate a member group and qualify a respective member to purchase the cryptocurrency based on a reward or point system. According to one embodiment, an issuer defines a discount value on the system for the unit of digital currency based on the first baseline value and the second redemption value. According to one embodiment, the at least one processor is further configured to generate a user interface configured to display the encoded mapping associated to the at least one digital currency unit responsive to a transfer request. According to one embodiment, the at least one processor is further configured to generate a user interface configured to display content selection options associates with transfer and redemption of the at least one digital currency unit.

According to one aspect a computer implemented method for managing global cryptocurrency issuance and redemption is provided. The method comprises generating, by at least one processor, digital currency units and encodings of discount incentives; generating, by the at least one processor, the digital currency units based on a stable face value having a first baseline value; managing, by the at least one processor, exchange of at least one digital currency unit based on a second incentive value, wherein the second incentive value is less than the first baseline value between an issuer and recipient; creating, by the at least one processor, a block of a distributed ledger including the first baseline value and the incentive value and communicating the block to a distributed ledger responsive to exchange of the at least one digital currency unit; registering and validating, by the at least one processor, a community of users, wherein the community component is further configured to link collateral accounts to respective users; generating, by the at least one processor, an encoded mapping associated to the at least one digital currency unit responsive to exchange of the at least one digital currency unit, and wherein the encoded mapping enables redemption of hard currency by a recipient user at at least the second incentive value or redemption at the first baseline value; determining, by the at least one processor, a context of exchange including at least one of hard currency context or redemption context; executing, by the at least one processor, a transfer of the at least one digital currency unit responsive to triggering of the encoded mapping by a user receiving the digital currency unit in response to hard currency exchange; and executing, by the at least one processor, a transfer of the at least one digital currency unit responsive to triggering the encoded mapping by an entity receiving the digital currency unit in response to redemption at the first baseline value. According to one embodiment, the method further comprises identifying at least a third context of exchange including a direct transfer context between community members. According to one embodiment, the method further comprises executing a transfer of the at least one digital currency unit responsive to triggering of the encoded mapping by a user receiving the digital currency unit in response to direct exchange. According to one embodiment, the method further comprises generating a block of a distributed ledger including information about a recipient of the cryptocurrency, and publishing the block to a public blockchain responsive to transfer, exchange, or redemption contexts. According to one embodiment, the method further comprises executing a transfer of the at least one digital currency unit to an escrow account subject to confirmation of parties participating in the exchange. According to one embodiment, the method further comprises releasing the at least one digital currency from the escrow account to the user receiving the at least one digital currency until responsive to a confirmation selection in a user interface communicated by a user transferring the at least one digital currency unit. According to one embodiment, the method further comprises evaluating a member group and qualifying a respective member to purchase the cryptocurrency based on a reward or point system. According to one embodiment, the method further comprises defining a discount value on the system for the unit of digital currency based on the first baseline value and the second redemption value. According to one embodiment, the method further comprises generating a user interface configured to display the encoded mapping associated to the at least one digital currency unit responsive to a transfer request. According to one embodiment, the method further comprises generating a user interface configured to display content selection options associates with transfer and redemption of the at least one digital currency unit.

According to one aspect, a method for managing global cryptocurrency issuance and redemption (including, for example, digital to hard currency conversion) is provided. The method comprises generating, by at least one processor, digital currency units and encodings of discount incentives; registering and validating, by the at least one processor, a community of users, wherein the community component is further configured to link collateral accounts to respective users; generating, by the at least one processor, an encoded mapping associated to at least one digital currency unit, and wherein the encoding mapping enables redemption of hard currency by a recipient user, supplied by a user receiving the digital currency unit. According to one aspect, a method comprising an issuer distributing digital stable-coin, in the form of a digital Token or digital Coin ("cryptocurrency"), in return for fiat currency is provided. According to one embodiment, the fiat currency is the US dollars. According to one embodiment, the issuer determines whether a member is qualified to purchase the cryptocurrency based on a reward or point system. According to one embodiment, a purchaser uses dollars, or other fiat currency, to buy cryptocurrency at a specified discount to the face value of the cryptocurrency, to be used to purchase goods or services, or to facilitate cash transfers. According to one embodiment, an issuer determines the discount amount to be applied. According to one embodiment, information about the purchase price of the cryptocurrency is stored on a block of a blockchain. According to one embodiment, funds paid to the issuer for cryptocurrency are held in a collateral or escrow account until redeemed for purchase or for cash. According to one aspect a method for transferring for the cryptocurrency after initial distribution is provided. According to one embodiment, the method further comprises the ability to send cryptocurrencies to other users. According to one embodiment, information about the purchaser, and transferee of coins or cryptocurrencies, are stored on a block of a blockchain. According to one embodiment, the method further comprises recording the cryptocurrencies purchase price, transference history, and the initial purchaser. According to one embodiment, an order is placed for a good or service from a provider at the rate of 100% of the cryptocurrencies face value, and transfer is effected as payment for the purchase of the good or service. According to one embodiment, the method further comprises the recording on the blockchain of details to be determined with regards to transactions involving the cryptocurrency.

According to one aspect a system is provided. The system comprises a non-transitory computer-readable storage medium comprising instructions stored which, when executed by the processor, cause the processor to perform operations comprising one or more of the following functions individually or in concert with each other: generating cryptocurrency in return for the delivery of a fiat currency; recording to a block of a blockchain the face value and discount purchase price of that cryptocurrency, and storing information related to the transaction including identifying information regarding the purchaser; referencing a database to assure compliance with regulatory requirements for the sale of cryptocurrency and transfer of cash; sending cryptocurrency from the digital wallet of a sender to the digital wallet of a receiver by recording information about said transfer into a block on a blockchain; determining whether the owner of that cryptocurrency is authorized to transfer that cryptocurrency as a "cash transfer," by validating the senders identity, with reference to information stored on the blockchain; and calculating the correct number of cryptocurrencies to be transferred by applying the following formula: $TA=DA*TRA$, wherein:

TA=Transfer Amount
DA=Dollar Amount
TRA=Cryptocurrency Purchase Price as a percentage of a dollar requesting input from a user as to the local currency where the cryptocurrency will be redeemed; inputting a dollar exchange rate, to be determined by the cryptocurrency issuer; calculating an inputted dollar transfer amount, applying a conversion rate in currency local to the receiver of the cryptocurrency, notifying the receiver of the cryptocurrency that the cryptocurrency is cued for transfer, allowing the receiver of the cryptocurrency to accept or reject the transfer; generating a bar code and delivering same to the sender of the cryptocurrencies through an application run on the sender's smart phone; sending instructions, so that a bar code may be sent to the ultimate receiver of paper currency by email or by text; delivering the cryptocurrency to the digital wallet of an authorized receiver when the receiver of the cryptocurrency scans a bar code (a "paper digital wallet"); and transferring a cryptocurrency to the digital wallet of the issuer, and concurrently executing a wire transfer of fiat currency through a bank from the issuer of the cryptocurrency to the redeemer of that cryptocurrency.

According to one aspect a device is provided. The device comprises one or more memory devices and one or more processors, operatively coupled to one or more memory devices, to receive, from a user device, an input that indicates a request to do one of the following operations: purchase cryptocurrency from an issuer by entering instructions to effectuate the transfer of fiat currency from the purchaser to the issuer; transfer cryptocurrency to other members of a community; transfer cryptocurrency to a goods or service provider in return for a good or service; redeem cryptocurrency to the issuer of same for cash at an agreed upon discount to the cryptocurrency's face value; transfer cryptocurrency from one member to another member, concurrent with the redemption of that currency from the issuer, and a transfer of funds from the issuer to the receiving member; and transfer cryptocurrency from one member to another member concurrent with the generation of a transferable barcode for the sending member to redeem for cash denominated in the local currency.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objectives, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. Various aspects, embodiments, and implementations discussed herein may include means for performing any of the recited features or functions.

BRIEF DESCRIPTION OF THE DRAWINGS

Various aspects of at least one example are discussed below with reference to the accompanying Figures, which are not intended to be drawn to scale. The Figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the Figures, each identical or nearly identical component that is illustrated in various Figures is represented by a like numeral. For purposes of clarity, not every component may be labeled in every Figure. In the Figures:

DETAILED DESCRIPTIONS OF THE DRAWINGS

Systems and methods for performing the concepts disclosed herein can include functions to: distribute one unit of cryptocurrency to members of a community based on a rewards or point system, and tying the face/issuance value of the cryptocurrency unit to a discounted amount of hard currency (e.g., US Dollars); storing information about the cryptocurrency unit, and its initial discount issuance into a block of a blockchain; creating an encoded mapping to the cryptocurrency unit; enabling redemption of the cryptocurrency unit for hard currency of any denomination via community participation.

Figure 9:
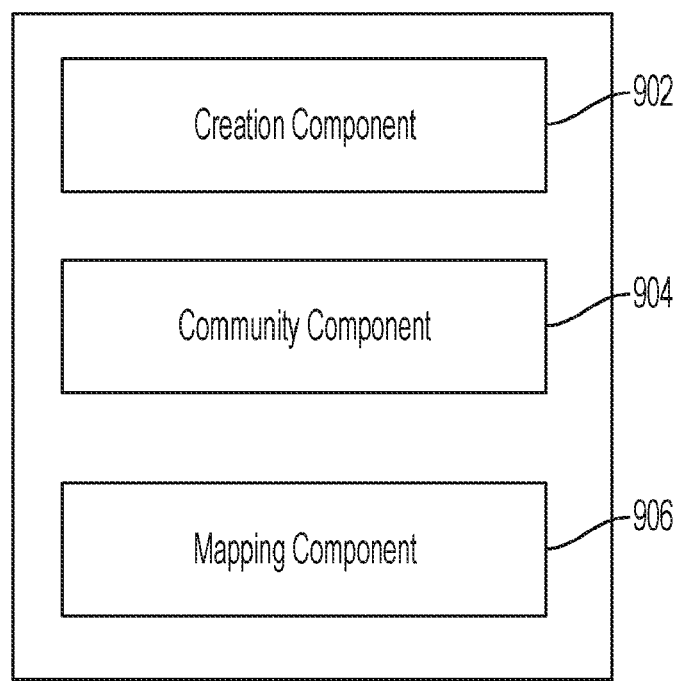
FIG. 9 is a block diagram of an example system, according to one embodiment.

Shown in FIG. 9 is an example embodiment of the cryptocurrency system 900. According to various embodiments, the system can be configured to execute any of the described functions herein generically or in various alternatives to instantiate specific system components tailored to execute specific functions.

According to one embodiment, the system can include a crypto creation component 902. The crypto creation component is configured to generate coin for exchange through the system. According to one embodiment, the coin can be generated at a discounted value to facilitate subsequent exchange, and issuance of hard currency via community members. Various embodiments of the system 900 include a community component 904 configured to manage registration of community members, qualification of registered users, and compliance with any community requirement.

In further embodiments, the system can include a mapping component 906 configured to generate an encoded mapping associated with respective coin. For example, the mapping component can generate a barcode link to an associated coin. Users can redeem hard currency with the mapping. In one example, the system can include connections to distribution system, and the user can present the barcode for scanning. Upon scanning, the distribution system issues hard currency for the value associated with the coin.

According to various embodiments, the system enables hard currency redemptions at any location across the globe. For example, the digital value becomes completely liquid under operation of the system and exchangeable for any hard currency medium.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

According to one aspect, a system configured as disclosed herein can include: a processor; and a computer-readable storage medium having instructions stored which, when executed by the processor, cause the processor to perform operations comprising: generating instructions for the transference of funds paid for the cryptocurrency to a bank account to be held as collateral for the cryptocurrency system; determine whether the purchaser of the cryptocurrency would be able to transfer that cryptocurrency as part of a peer-to-peer cash transfer network, or might only use that cryptocurrency as a medium of exchange for good and services at participating retailers; recording the determination in a block of the blockchain; overlaying an identity check on all parties sending or receiving a cryptocurrency unit for paper currency redemption; and confirming regulatory compliance for all uses of the digital currency.

Various embodiments, can include a digital wallet integrated into an a user device or system, the user device can include one or more memory devices and one or more processors, that when a series of inputs and commands are given will execute a transfer of cryptocurrency (e.g., as a gift), in exchange for goods or services, for redemption from the issuer, or for sending paper money to others, anywhere in the world, for little or no cost. In further embodiments, a peer-to-peer paper currency transfer function can be included in the architecture/device. In some embodiments, the system is configured to limit hard currency redemption functionality to eligible community members.

For example, the system can be configured to maintain eligibility to transfer cash as an incentive. In further example, the system is configured to allow members to buy more cryptocurrency, enjoy discounts, send money anywhere in the world, and expand their social and business networks domestically and abroad—and the architecture of various embodiments enables this functionality beyond that available in conventional crypto based exchanges.

According to various embodiments, the system is configured to encode the ability to transfer cash into the cryptocurrency. For example, based on the operations disclosed herein, when someone receives the cryptocurrency, the system enables easy conversion back to fiat/hard currency, for example, directly from the issuer in the form of a bank related redemption.

According to various implementation, when cryptocurrency is purchased from the issuer, they can be used as a guaranteed form of payment for retailers, traceable through the blockchain, and refundable in fiat currency.

For example, where a community member wants to send money (not paper currency) to a fellow member (who may be a friend, or family member), the user merely transfers the cryptocurrency (e.g., coins) via the system and can, for example, input instructions for a simultaneous cash redemption in favor of the receiving member.

According to some embodiments, the peer-to-peer paper currency transfer function could be included to allow actual fiat currency, in the form of local paper money, to be received by anyone, in any country where community members are located.

In other embodiments, if a community member wants to send cash to someone, in- or out-of-the community, in another location, the user sends the cryptocurrency to a local community member in the same manner as described above, but, in this case, the local community members pays for the cryptocurrency by giving cash to the sender's friend or family who comes to pick it up.

In one example, the system is configured to generate mappings (e.g., encoded mappings) linked to issued cryptocurrency. According to another example, a barcode is generated when the command to send cash is inputted. That barcode must be scanned for the cryptocurrency to move from the sender's digital wallet to the receiver's digital wallet. In execution, the respective barcode is sent only to the sender, and the sender can forward the barcode by text or by email to the ultimate recipient of the hard currency.

For example, when the ultimate recipient of the physical currency presents the bar code to be scanned by another community member and the member exchanges the physical cash for the digital. In various examples, the mapping (e.g., bar code) is configured to function as a paper "electronic wallet" and once cash is paid cryptocurrency is transferred by the system.

In further aspects, the system, architecture, and the methodology incentivizes members to facilitate the cash transfers by enabling them to "buy" more cryptocurrency at a discounted price. Further, the methodology incentivizes members to facilitate the cash transfers by transferring cash at an exchange rate that is inputted by the cryptocurrency issuer and, for example, can be more attractive than local rates.

While there will be a limit on the total amount that can be sent in any one transaction, there will be no transfer fee, and currency exchange rates will be incorporated into transfers by the issuer.

Figure 1:
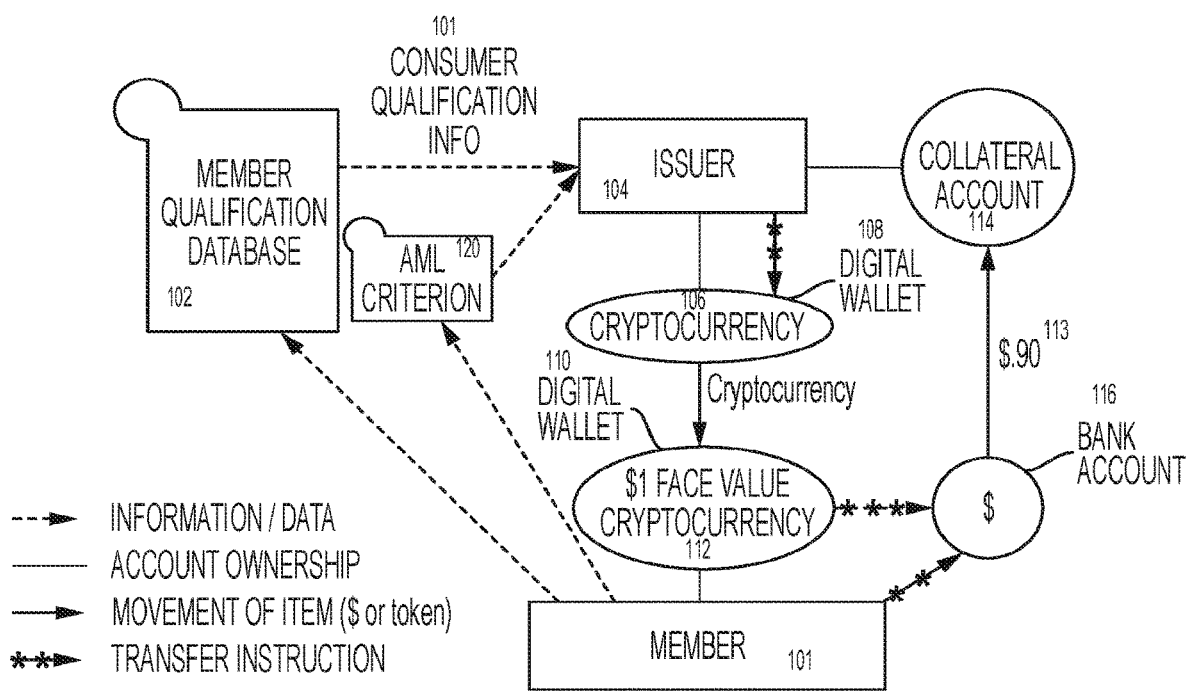
FIG. 1 illustrates the distribution of the cryptocurrency to qualified members of a community.

Shown in FIG. 1 as an example block diagram of system components and operations executed by various embodiments of the system. As discussed, members (e.g., 101) may be vetted for specific qualifications (e.g., 101). Once qualified, the members can be stored in a qualification database 102 and consumer qualification information can be accessed by the system at any time to ensure that a respective user meets any qualifications for participation. For example, a coin issuer 104 can set various requirements on the system.

As shown in FIG. 1, an issuer can create coin (e.g. 106) stored in a digital wallet (e.g., 108) which may be transferred to a digital wallet (e.g., 110) of another community member. Each issuer and community member can be required to have collateral accounts (e.g., 114) in order to meet member requirements or qualifications. Banks, other financial institutions, or redemption centers can interact with the collateral accounts and facilitate hard currency redemption, for example, via bank account 116.

According to various embodiments, the member qualification requirements and operational requirements of the system can be configured to ensure AML criteria is met (e.g., 120). According to further embodiments, various jurisdictional requirements can be encoded on the system and/or as part of member qualifications. For example, the system can enforce specific regulation on the transfer of monies between various country settings. As shown, the discount value (e.g., $0.90 (e.g., 113) for $1 face value (e.g., 112)) allows a coin with an issue value of one dollar to result in a transfer of hard currency of $0.90.

Figure 2A:
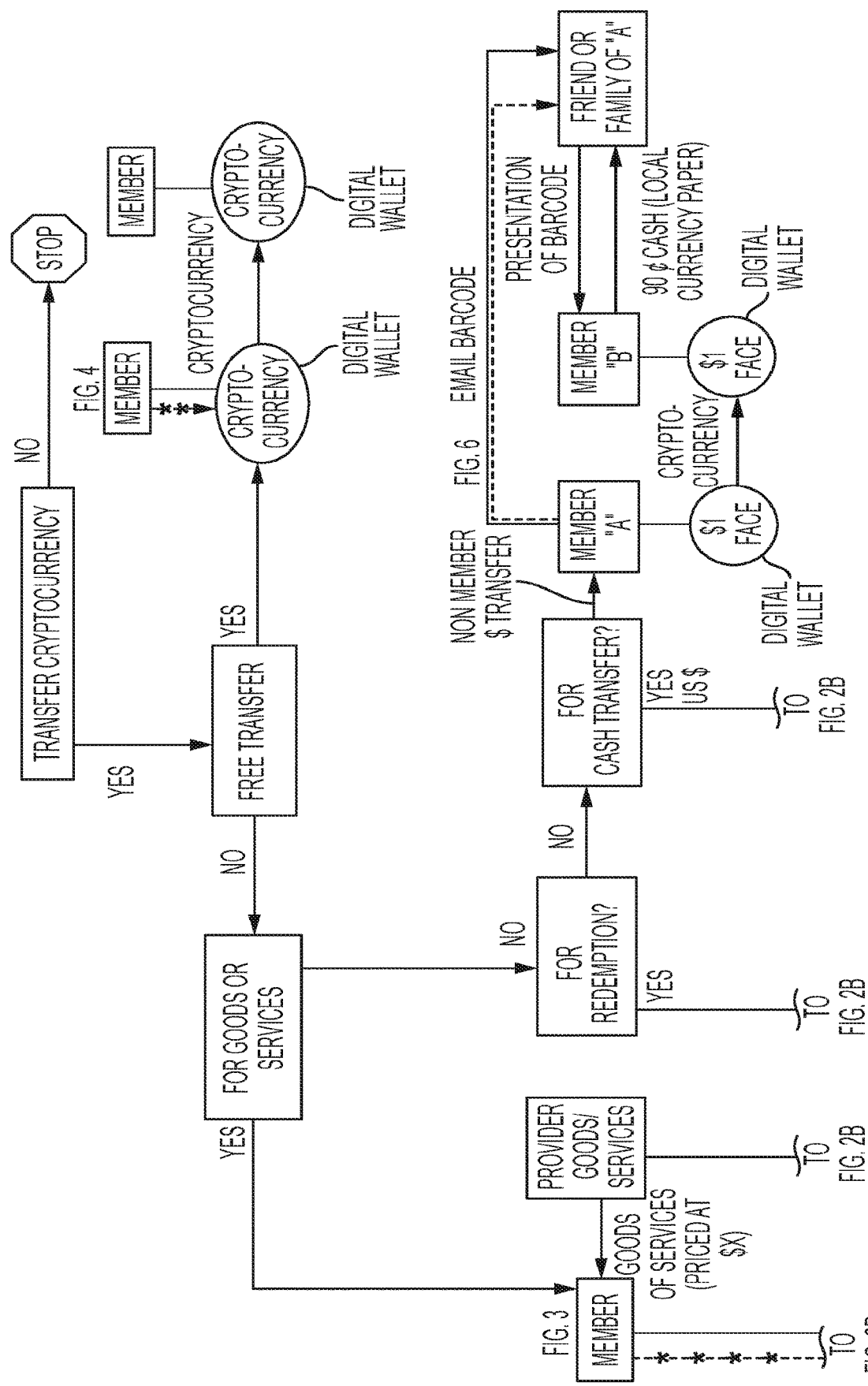
FIGS. 2A-B illustrates a flow chart of various use cases for transferring cryptocurrency.
Figure 2B:
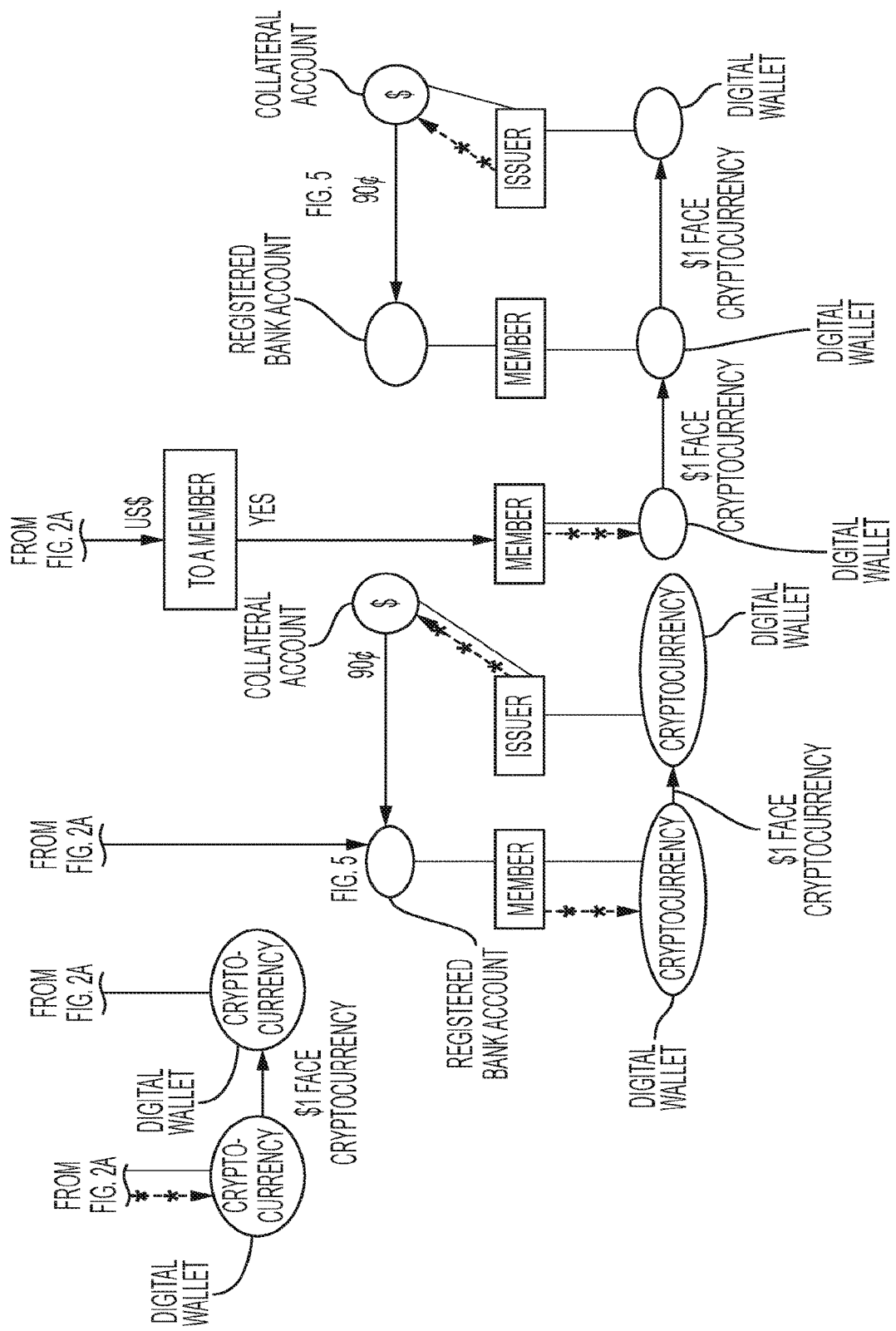

FIG. 2 is an example flowchart of transfer use cases executed by various embodiments of the system. As shown, FIG. 2 provides a high-level view of the interactions between issuers, members, cryptocurrency. Additional details can be implemented in the process flows shown in FIG., for example, as described with respect to FIG. 3 through FIG. 6.

Figure 3:
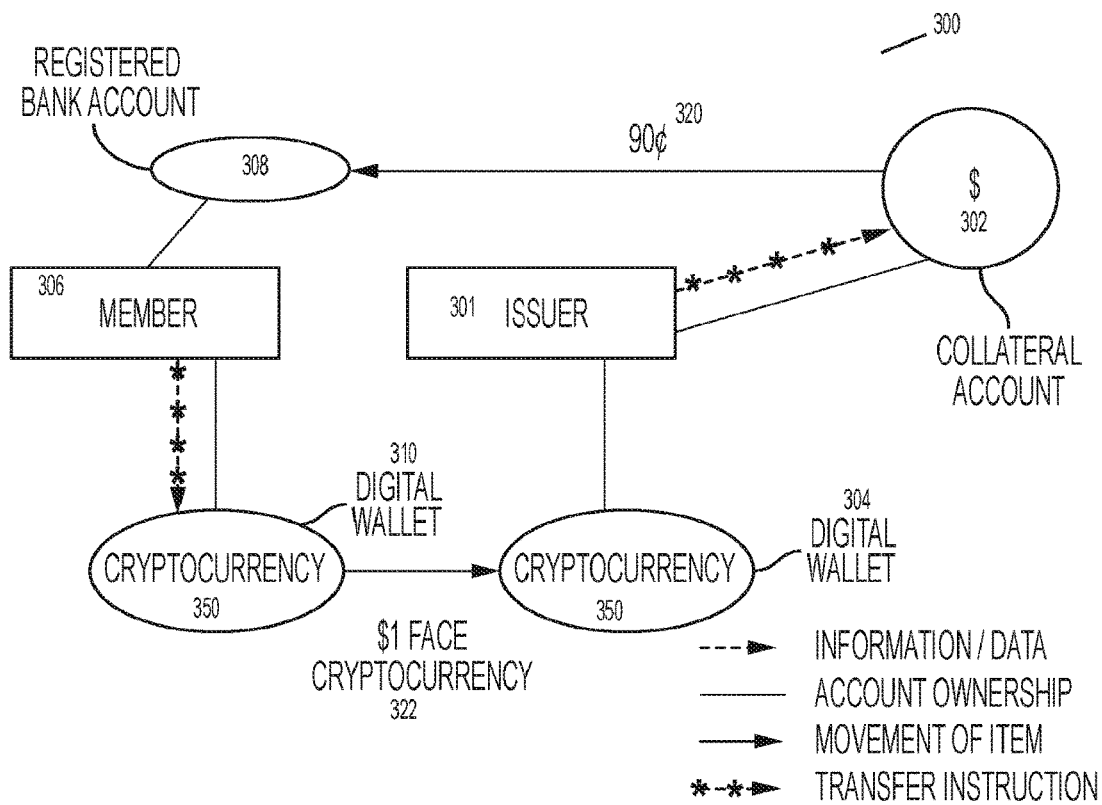
FIG. 3 illustrates the redemption of a cryptocurrency by the issuer.

FIG. 3 is an example flow 300 for redemption of crypto currency (e.g., 350) from a respective issuer (e.g., 301). In one example an issuer is associated with a collateral account 302 and a digital wallet 304. A community member (e.g., 306) likewise is associated with a collateral account and/or a registered bank account (e.g., 308) and their own digital wallet (e.g., 310). A crypto currency unit (e.g., coin) (e.g., 314) can be transferred between the digital wallets (e.g., 310 to 304). As shown in FIG. 3, the discount value (e.g., $0.90 (e.g., 320) for $1 face value (e.g., 322)) allows a coin with an issue value of one dollar to result in a transfer of hard currency of $0.90. In other examples, different discount rates can be used. And in further embodiments, discounts can be tied to downstream redemptions of the coin or digital currency unit.

Figure 4:
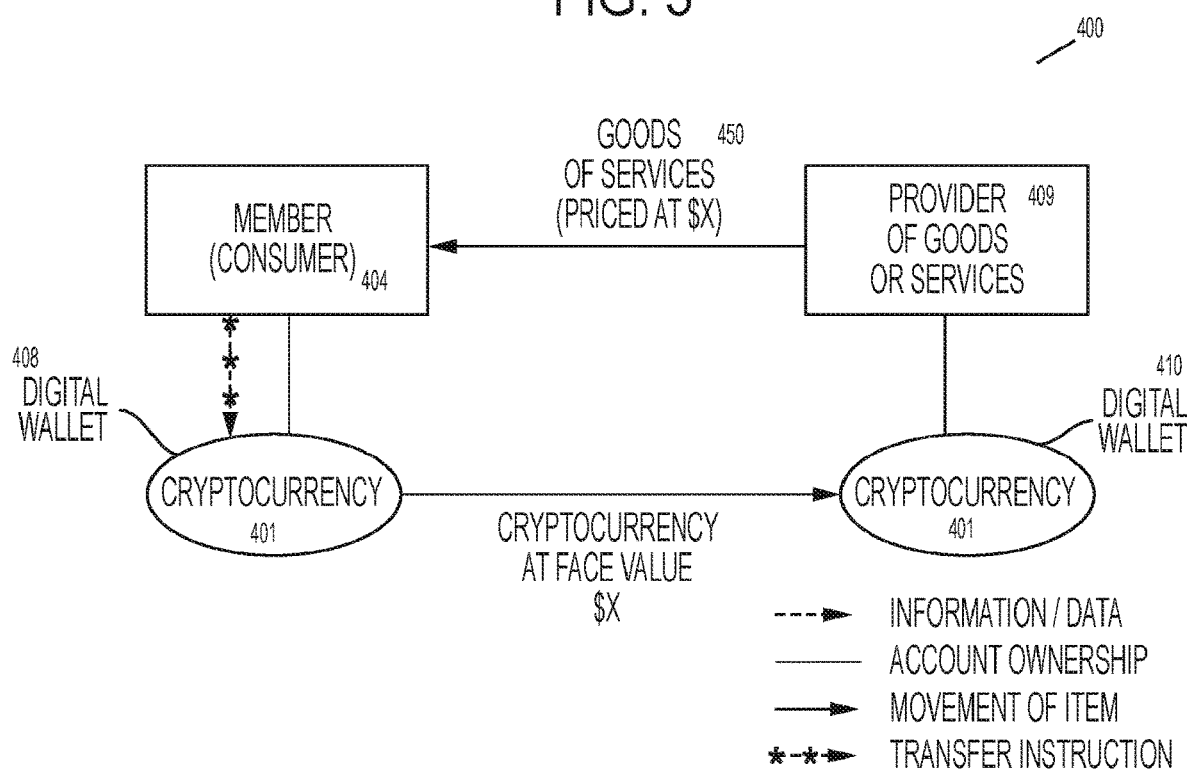
FIG. 4 illustrates a flow chart for using the cryptocurrency to purchase goods or services from a provider of good or services.

FIG. 4 illustrates an example process flow 400 for using cryptocurrency (e.g., 401) to purchase goods or services (e.g., 450). In this embodiment, a member (404) holding cryptocurrency units can transfer from their digital wallet 408 to a digital wallet (e.g., 410) of a good or services provider (e.g., 409). Based on the potential discount for purchase of goods and services (e.g., goods and services value $X (e.g., $1)>member input to obtain cryptocurrency (e.g., $0.90), the system facilitates the exchange and redemption of hard currency between issuers and members.

Figure 5:
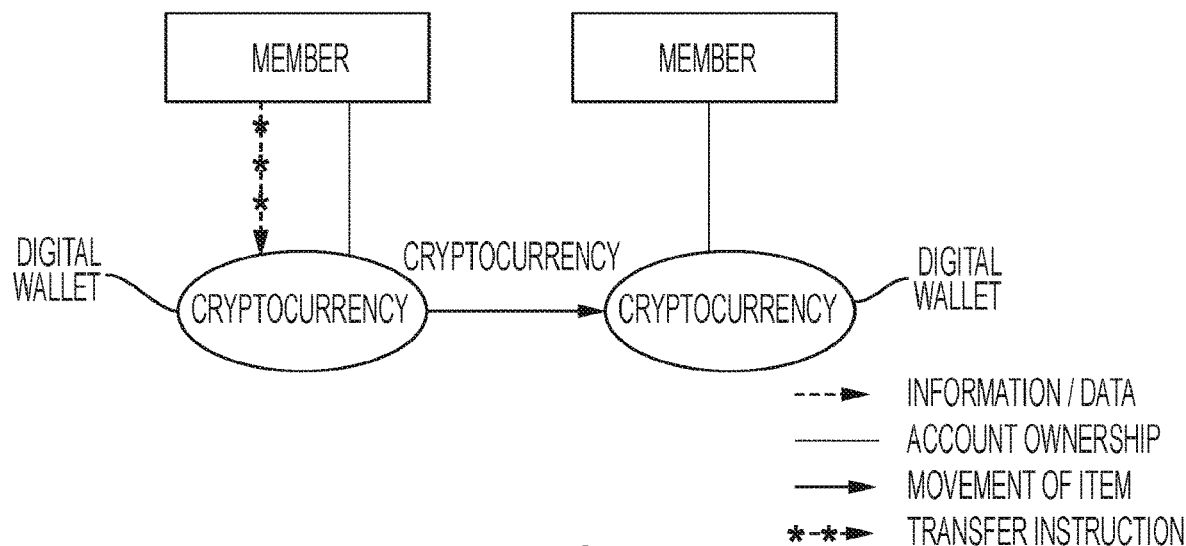
FIG. 5 illustrates a member-to-member cryptocurrency transfer.

FIG. 5 shows an example process flow of crypto currency exchange between members. In this example each member has their own digital wallet and each member can execute transfers between community members. According to other embodiments, the system can enforce qualification requirements, regulatory compliance, AML standards, among other options.

Figure 6:
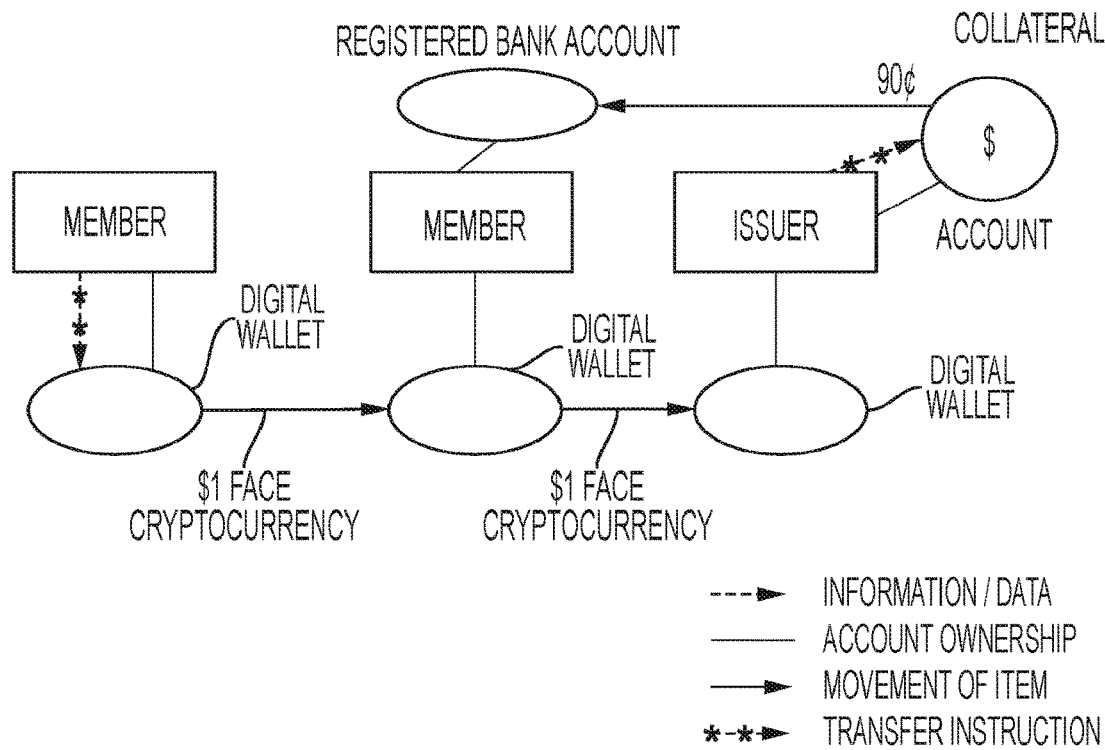
FIG. 6 illustrates a member-to-member cryptocurrency transfer of fiat currency.
Figure 7:
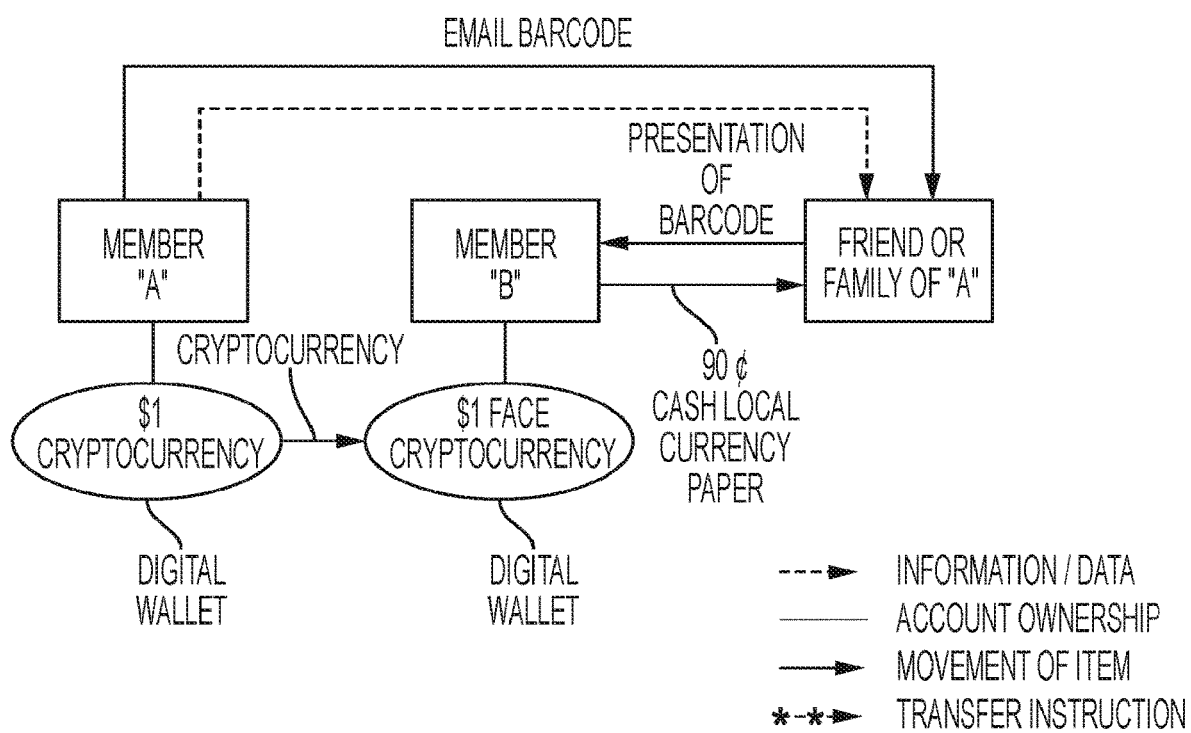
FIG. 7 illustrates a member-to-member cryptocurrency transfer to effectuate a cash transfer to friends or family of the sender.

FIG. 6 is an example process flow for hard currency exchange using crypto currency units. FIG. 7 shows an example process flow for using the system and digital currency to deliver cash of any local denomination even outside of the community members. For example, a community member can enable redemption by a friend or family member or other user using encoded mappings associated with digital currency units.

Figure 8:
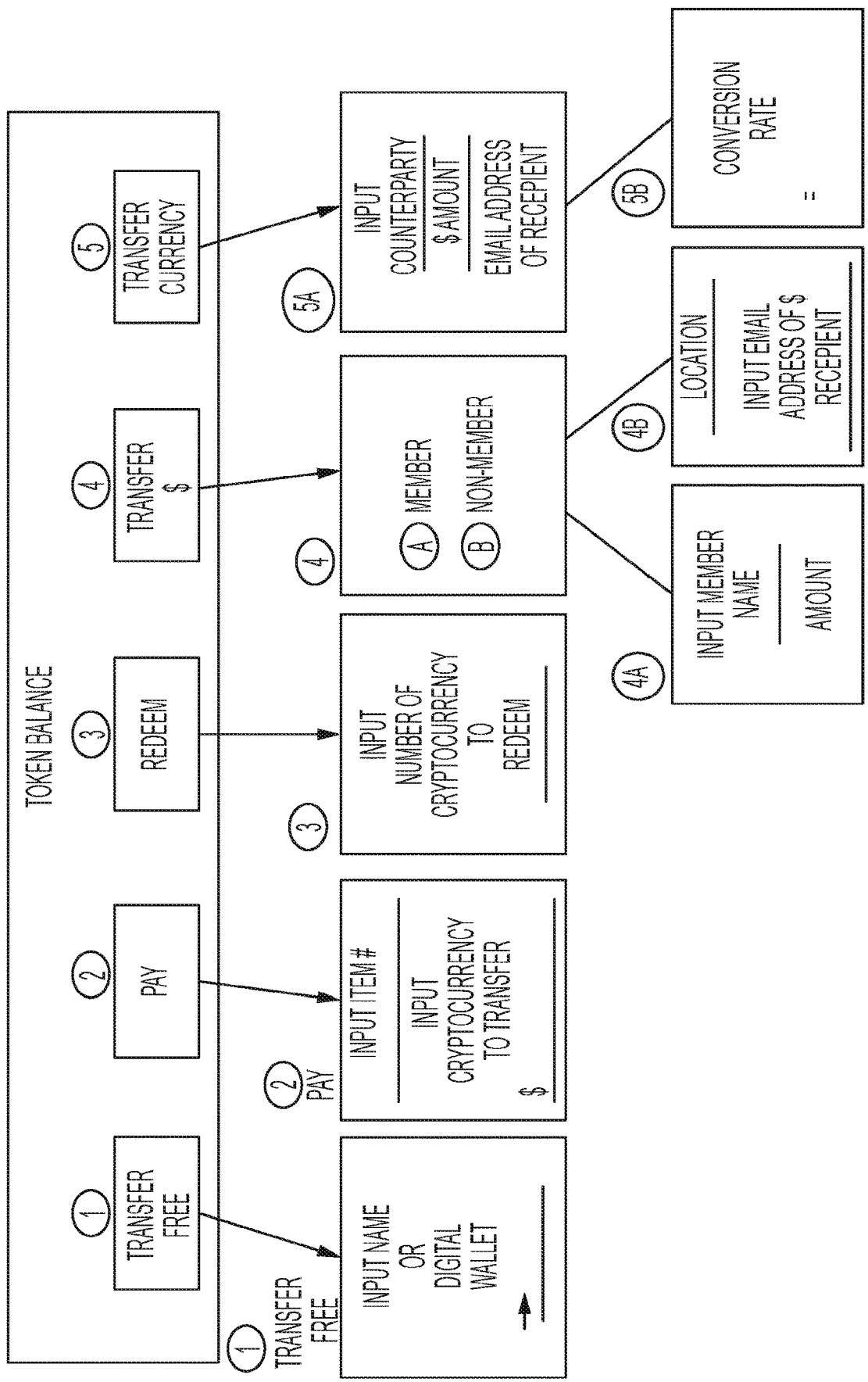
FIG. 8 illustrates an exemplary computer system screen flow.

FIG. 8 is an example of screen flows for an embodiment of the system. For example, a home screen can provide access to various system functionality. For example, the functionality can include a token balance display, a free transfer option, a payment option, a redemption option, a transfer cash option, and/or a transfer currency option.

For example, the transfer free option allows a member to input the name of another member or digital wallet address. In another example the pay function enables a member to pay for goods or services or identify a number of tokens/coins to transfer to a goods or service provider.

In another example the redemption operation enables a user to input a number of crypto currency units to redeem—which may include crediting of a collateral account or redemption of hard currency.

According to one embodiment, the system includes transfer options to members and nonmembers of the community. If transfer to a member, the system excepts a member name in an amount to transfer. In another example, a nonmember operation can include specification of a specific location and identifying information for the nonmember (e.g., input email, address, name, phone number, device ID, encoding ID, among other options).

The system may include additional user screens to enable transfer of currency that involves exchange rates. For example, the user can input an amount of money and/or currency units and spent a recipient. The user interface may also require specification of a location which enables the system to identify a local currency and a conversion rate that may apply. In one example user interface will display the conversion rate and permit the user to accept or reject the transaction.

Example Use Case—FOODCO Token Offering

In various embodiments, the system and managed coin or tokens are configured to have greater utility and desirability than conventional coin offerings. The following example illustrates described improvements and example implementation in a real world setting. The following description is based on a hypothetical food company—FOODCO—that sells an almond flavored power bar called "Zingo" through social networking. Zingo is so delicious that a worldwide network of Zingo enthusiasts has emerged. They are the members of the Zingo social network. In various environments, social selling networks facilitate product sales in local communities. In various embodiments of the system, social networking services can be integrated and provide another platform for interacting with an intended recipient of a money transfer.

With regards to FOODCO, the global distribution network of FOODCO sellers purchase the almond flavored power bar and resell it to customers. In some examples, the sellers can do this by operating stores (franchises) or by selling Zingo "out of their garage." Customers pay cash for Zingo, by credit card, or by using a Zingo App that allows customers and to quickly order Zingo from local sellers who will deliver to them; sellers often directly deliver Zingo bars to customer's homes to make them more convenient to get.

In some examples, tokens are a new currency for the Zingo community. For example, a FOODCO token is made available, to a remote group of FOODCO sellers who are qualified to purchase the token based on history with the company or amount of product sold. (In further examples, qualification on the system can be expanded, for example, to include anyone in the Zingo social network).

In some embodiments, the system is configured to a limited number (e.g. 50,000,000) tokens for a discounted value (e.g., 90 cents) each, with each token having a face value (e.g., $1). In this example, while 50 million dollars of tokens exist, they are supported by $45 million dollars in cash held by FOODCO. The opportunity to purchase these tokens would be limited to specific time frames or to the achievement of certain selling goals, which can be encoded at generation.

Tokens can be used to purchase Zingo from the company (at "face" value) or may be redeemed for cash from FOODCO at the purchase price of the token (i.e. 90 cents on the dollar) providing a stable baseline value for the coin offering (e.g., stablecoin). When using tokens to purchasing products for resale or personal enjoyment, the token user/Zingo enthusiast enjoys what is effectively an additional 10% discount over whatever redistribution discount may be available; I.E. the face value of the token is 10% higher than the purchase price of that token (the value of the discount is realized when purchasing product).

According to various embodiments, this discount fuels the ability and incentive to move money using tokens and, for example, through social networks around the world. Since tokens can be transferred to purchase a real world product (i.e. Zingo) at a discount, or redeemed for cash, tokens become a new form of electronic currency. In the same way tokens might be used to buy product, they can also be "moved around" as an alternative money transfer system. According to some embodiment, the ability and liquidity facilitating the transfer network can include at least components—a social network, a product linking members of that network, global and broad use of that product by product enthusiasts.

For example, when a FOODCO seller wants to send money to a family member, he merely uses the FOODCO system to transfer tokens. No matter where a recipient is located, a swipe from an APP (that had traditionally been used to place orders for Zingo) transfers tokens from one digital wallet to another based on an encoded mapping. The token can then be redeemed through the banking system from FOODCO at the initial purchase price for cash (at the initial Token issuance price), redeemed for Zingo at face value or transferred to another local Zingo enthusiast who could hand hard cash (e.g., paper money) to the tokens new owner in return for tokens.

Since the token has a higher face value than the redemption value, the receiving FOODCO enthusiast receives a benefit by paying a discount to face value when purchasing the tokens, and then in using those tokens to buy more Zingo. Since there are only a limited numbers of tokens in circulation, people will be excited to get tokens that will help them feed their Zingo obsession.

A seller redeeming a TOKEN at face value to buy product for resale achieves additional profit by facilitating a transfer since they now have tokens with "dollar" face value purchased for 90 cents. Since initially there is a limited number of tokens, the transfer of existing allows holders to enjoy the benefits of the discount to face value. According to various embodiments, this discount thereby fuels the incentive to maintain the transfer system within the community. The ability to transfer money without cumbersome intermediary systems and/or participants yields great efficiencies and benefits for companies like FOODCO and members of social networks centered around a product or a distribution network like FOODCO.

For example, the system enables movement of money throughout a global network of sellers and customers without requiring a recipient to drive to a store or bank that could be far from her home. Specifically, other members of the Zingo community can deliver money (along with Zingo) when a transfer is executed. As discussed, the architecture of the system further eliminates intermediary processing systems that are conventionally required.

Indeed, even Zingo non-enthusiasts can benefit where they have a friend who wants to send them money and that friend is able to send money using tokens. For example, the transfer can be executed by the system, in essence, by piggy backing on the FOODCO social network (i.e. finding someone in the Zingo network willing to buy tokens). In another example, if Janet wants to send Dave cash, she sends him a barcode by text or email. Dave then goes to a local Zingo seller who upon paying the cash scans the barcode that Dave brings with him which causes the system to release the tokens into the seller's digital wallet (i.e. transferring Token form Janet to seller). The barcode thus operates as a "paper" digital wallet preventing fraud; the barcode is no longer usable after the tokens are transferred.

To encourage the seller to help out Janet and Dave (i.e. facilitate the transfer), Janet would send 111.11 tokens to the seller who would pay Dave $100 (the 10% discount). While Dave gets $100 in cash (or equivalent value of local currency), the seller ultimately receives the tokens now has over $111 to spend on her favorite almond flavored slice of heaven.

The system enables many permutations in various embodiments for sending and receiving money, and the tokens that connect them. Additionally, various embodiments can leverage the social network integration and the built-in discount to fuels the transfer of money/tokens. In further embodiments, fraud in the system can be prevented because before the tokens move, the local seller gives cash to the member from whom the sender will ultimately receive the money.

The inventors have realized that facilitating money transfers can help FOODCO sellers expand their networks and sell more product. As the desirability of FOODCO token grows, the system can be configured to ease qualification requirements. In some examples, the tokens themselves could be an acceptable form of currency at a wide range of vendors outside of FOODCO. In that case, there may be no reason to ever redeem them for fiat currency. If they can be negotiated for goods and services, they are money.

In some implementations, the system manages the proceeds of token sales by transferring the funds into a collateral account, until such time as they are used to buy product from the company or are otherwise redeemed. At that point, the money can be released from the collateral account, either to the company for the product, or to the redeeming member for the redemption. tokens might then be retired or reissued. In various examples, the collateral the company is holding will not be used for any other purpose but to support token usage. In further embodiments, the privilege/authorization to purchase tokens is conditional on meeting certain selling objectives, and allocations will be based on a reward system.

A digital wallet can be added to any existing FOODCO App before launch. This will benefit FOODCO sellers who can purchase product from FOODCO for distribution and for FOODCO customers who can use tokens from their App to pay for products in the same way they might use a credit card—however, without any credit card fees.

FOODCO customers can also use their wallets to transfer tokens to others. Once using tokens becomes pervasive, it is expected that people will be able to use such tokens as money outside the FOODCO network.

Various embodiments enable the ability to easily transfer money anywhere in the world based on an issued token (e.g., FOODCO token). For example, members have the ability to send money to friends and family for little or no cost even across borders. A "Cash Transfer" function can also allow fiat currency (local cash) to be received by anyone in any country where FOODCO products and/or services are sold.

As the example token offering is stable the tokens may always be redeemed for their purchase price from the company. Thus, the ability to transfer money is thereby embedded into the token—when someone receives a token, it is easily converted into fiat currency. The combination of transferability and redeemability drives seamless transfer.

In further embodiments, token offerings are structured to comply with regulatory requirements:

The FOODCO token is not being issued to raise money for the company. The network of users already exists as does a FOODCO App where the Digital Wallet might reside;

The FOODCO tokens will be immediately usable for to buy FOODCO product at a discount;

FOODCO tokens can only be transferred to Company Wallets, and not to wallets external to the Platform;

Tokens will be sold at a fixed price to facilitate the discount and each token will represent an obligation to supply FOODCO product at a value of one USD per token;

FOODCO can redeem tokens at a discount to the face value; and

FOODCO tokens are marketed in a manner emphasizing the functionality of buying FOODCO product.

The various methods described above are provided as an illustration and are not meant to limit the scope of the application of this technology.

A reward system within a social selling network, where discounts are available to high performing sellers, lends itself to a smart contract that can incorporate rules for token distribution and ultimately funds transfers across borders.

Figure 10:
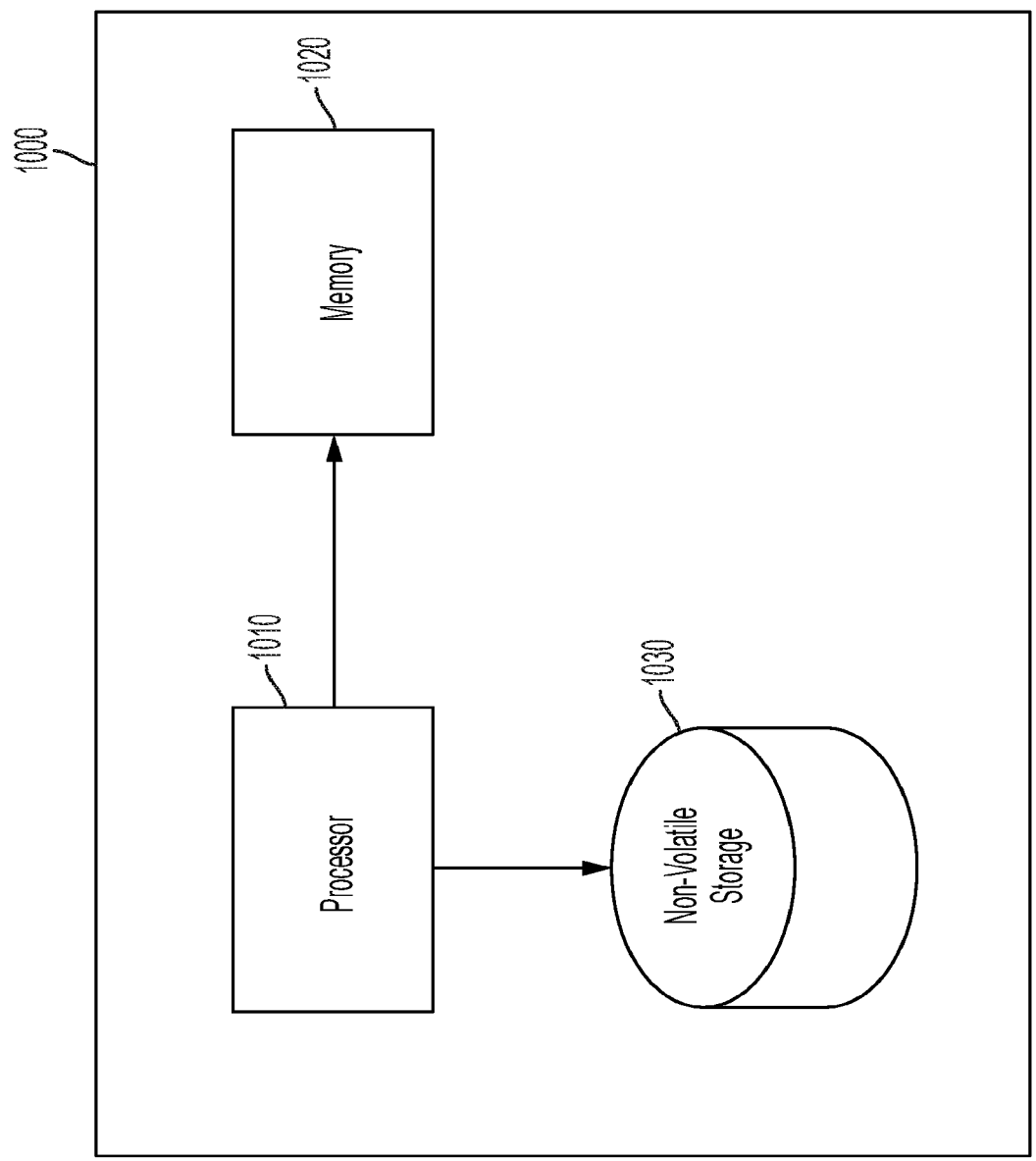
FIG. 10 is a block diagram of a special purpose computer system on which various functions discussed herein may be practiced, according to one embodiment.

Additionally, an illustrative implementation of a computer system 1000 that may be used in connection with any of the embodiments of the disclosure provided herein is shown in FIG. 10. The computer system 1000 may include one or more processors 1010 and one or more articles of manufacture that comprise non-transitory computer-readable storage media (e.g., memory 1020 and one or more non-volatile storage media 1030). The processor 1010 may control writing data to and reading data from the memory 1020 and the non-volatile storage device 1030 in any suitable manner. To perform any of the functionality described herein (e.g., image reconstruction, anomaly detection, etc.), the processor 1010 may execute one or more processor-executable instructions stored in one or more non-transitory computer-readable storage media (e.g., the memory 1020), which may serve as non-transitory computer-readable storage media storing processor-executable instructions for execution by the processor 1010.

The terms "program" or "software" or "app" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements.

This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

The terms "approximately," "substantially," and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed:

1. A system for managing global cryptocurrency issuance and redemption, the system comprising:
   a memory; and
   at least one processor operatively connected to the memory and configured to perform operations comprising;
      generating digital currency units, wherein each of the digital currency units comprises a stable face value;
      receiving, by an issuer, an issuance request for at least one digital currency unit from a digital wallet of a recipient;
      in response to receiving the issuance request, automatically generating a query based on at least information provided by the recipient in the issuance request;
      determining that the recipient is a qualified purchaser based on automatically sending the query to a qualification database and receiving a response from the qualification database;
      managing exchange of the at least one digital currency unit from a digital wallet of the issuer to the digital wallet of the recipient, wherein the exchange is based on an incentive value that is less than the stable face value;

creating a block of a distributed ledger including information corresponding to the recipient, the stable face value and the incentive value corresponding to the at least one digital currency unit and communicating the block to a distributed ledger responsive to exchange of the at least one digital currency unit, wherein the block comprises a digital signature that is encrypted using a public cryptographic key and a private cryptographic key;

validating that an owner of the at least one digital currency unit is authorized to transfer the at least one digital currency unit by validating an identity of the owner based on at least the block of the distributed ledger and a validated community of users, wherein the validating includes sending transaction details for the at least one digital currency unit to a network of nodes on a blockchain responsible for the block;

receiving, from a user, a request to exchange the at least one digital currency unit, wherein the request comprises an encoded mapping associated with the at least one digital currency unit, wherein the encoded mapping was transferred from the recipient to the user, wherein the user is not a qualified purchaser of the digital currency units and wherein the at least one digital currency unit remains in the digital wallet of the recipient;

determining a context of exchange corresponding to the request, wherein the context comprises a hard currency context or a redemption context;

in response to the context being a hard currency context, transferring the at least one digital currency unit from the digital wallet of the recipient to the digital wallet of the issuer and transferring a hard currency amount to the user corresponding to the incentive value of the at least one digital currency unit; and in response to the context being a redemption context, transferring the at least one digital currency unit from the digital wallet of the recipient to a digital wallet of a goods or services provider, wherein the user receives goods or services from the goods or services provider in an amount corresponding to the stable face value of the at least one digital currency unit.

2. The system of claim 1, wherein the block of the distributed ledger is updated to include information about the issuer or the goods and services provider to which the recipient has transferred the at least one digital currency unit.

3. The system of claim 1, wherein an escrow account receives hard currency in the amount of the incentive value from the recipient in exchange for the at least one digital currency unit subject to confirmation of the issuer and the recipient participating in the exchange.

4. The system of claim 1, wherein the issuer defines the stable face value and the incentive value of the digital currency units.

5. The system of claim 1, wherein the operations further comprise:
generating a user interface configured to display information related to the request to exchange the at least one digital currency unit responsive to receiving the request to exchange.

6. The system of claim 1, wherein the encoded mapping comprises a barcode.

7. The system of claim 1, wherein the encoded mapping is generated by an application being executed on a device of the recipient and transferred to the user via electronic means.

8. The system of claim 1, wherein a collateral account of the issuer receives hard currency in the amount of the incentive value from the recipient in exchange for the at least one digital currency unit.

9. The system of claim 8, wherein the hard currency amount transferred to the user is transferred from the collateral account of the issuer.

10. The system of claim 1, wherein the operations further comprise:
registering and validating a community of users
linking collateral accounts to respective users;
identifying a third context of exchange including a direct transfer context between community members; and
executing transfer of the at least one digital currency unit responsive to triggering of the encoded mapping by a user receiving the digital currency unit in response to the direct transfer context.

11. A computer implemented method for managing global cryptocurrency issuance and redemption, the method comprising:
generating, by at least one processor, digital currency units and encodings of discount incentives;
generating, by the at least one processor, the digital currency units based on a stable face value;
receiving, by an issuer, an issuance request for at least one digital currency unit from a digital wallet of a recipient;
in response to receiving the issuance request, automatically generating a query based on at least information provided by the recipient in the issuance request;
determining that the recipient is a qualified purchaser based on automatically sending the query to a qualification database and receiving a response from the qualification database;
managing, by the at least one processor, exchange of the at least one digital currency unit from a digital wallet of the issuer to the digital wallet of the recipient based on an incentive value, wherein the incentive value is less than the stable face value;
creating, by the at least one processor, a block of a distributed ledger including information corresponding to the recipient, the stable face value and the incentive value corresponding to the at least one digital currency unit and communicating the block to a distributed ledger responsive to exchange of the at least one digital currency unit;
validating that an owner of the at least one digital currency unit is authorized to transfer the at least one digital currency unit by validating an identity of the owner based on at least the block of the distributed ledger and a validated community of users, wherein the validating includes sending transaction details for the at least one digital currency unit to a network of nodes on a blockchain responsible for the block;
receiving, from a user, a request to exchange the at least one digital currency unit, wherein the request comprises an encoded mapping associated with the at least one digital currency unit, wherein the encoded mapping was transferred from the recipient to the user, wherein the user is not a qualified purchaser of the digital currency units and wherein the at least one digital currency unit remains in the digital wallet of the recipient;
determining, by the at least one processor, a context of exchange corresponding to the request, wherein the context comprises a hard currency context or a redemption context;

in response to the context being a hard currency context, transferring the at least one digital currency unit from the digital wallet of the recipient to the digital wallet of the issuer and transferring a hard currency amount to the user corresponding to the incentive value of the at least one digital currency unit; and in response to the context being a redemption context, transferring the at least one digital currency unit from the digital wallet of the recipient to a digital wallet of a goods or services provider, wherein the user receives goods or services from the goods or services provider in an amount corresponding to the stable face value of the at least one digital currency unit.

12. The method of claim 11, wherein the method further comprises:

updating the block of the distributed ledger to include information about the issuer or the goods and services provider to which the recipient has transferred the at least one digital currency unit; and publishing the block to a public blockchain responsive to transfer, exchange, or redemption contexts.

13. The method of claim 11, wherein the method further comprises executing a transfer of hard currency in the amount of the incentive value from the recipient in exchange for the at least one digital currency unit to an escrow account subject to confirmation of the issuer and the recipient participating in the exchange.

14. The method of claim 11, wherein the issuer defines the stable faced value and the incentive value.

15. The method of claim 1, wherein the method further comprises:

generating a user interface configured to display information related to the request to exchange the at least one digital currency unit responsive to receiving the request to exchange.

16. The method of claim 11, wherein the encoded mapping comprises a barcode.

17. The method of claim 11, wherein the encoded mapping is generated by an application being executed on a device of the recipient and transferred to the user via electronic means.

18. The method of claim 11, wherein a collateral account of the issuer receives hard currency in the amount of the incentive value from the recipient in exchange for the at least one digital currency unit.

19. The method of claim 18, wherein the hard currency amount transferred to the user is transferred from the collateral account of the issuer.

20. The method of claim 11, further comprising:
registering and validating a community of users
linking collateral accounts to respective users;
identifying a third context of exchange including a direct transfer context between community members; and
executing transfer of the at least one digital currency unit responsive to triggering of the encoded mapping by a user receiving the digital currency unit in response to the direct transfer context.

\* \* \* \* \*